(12) United States Patent
Matkin

(10) Patent No.: US 10,676,878 B2
(45) Date of Patent: Jun. 9, 2020

(54) SYSTEMS AND METHODS FOR PROVIDING AN UNDERCARRIAGE MATERIAL HANDLING SYSTEM

(71) Applicant: Jeffery Lynn Matkin, Pocatello, ID (US)

(72) Inventor: Jeffery Lynn Matkin, Pocatello, ID (US)

( * ) Notice: Subject to any disclaimer, the term of this patent is extended or adjusted under 35 U.S.C. 154(b) by 0 days.

(21) Appl. No.: 16/676,374

(22) Filed: Nov. 6, 2019

(65) Prior Publication Data
US 2020/0149229 A1 May 14, 2020

Related U.S. Application Data

(60) Provisional application No. 62/757,707, filed on Nov. 8, 2018.

(51) Int. Cl.
*E01C 19/20* (2006.01)
*B60P 1/56* (2006.01)

(52) U.S. Cl.
CPC ............ *E01C 19/2015* (2013.01); *B60P 1/56* (2013.01); *E01C 19/20* (2013.01); *E01C 2019/208* (2013.01); *E01C 2019/2075* (2013.01)

(58) Field of Classification Search
CPC .......... E01C 19/12; E01C 19/15; E01C 19/18; E01C 19/182; E01C 19/20; E01C 19/201; E01C 19/2055; E01C 19/2075; E01C 19/208; E01C 2019/2055; E01C 2019/2075; E01C 2019/208; B60P 1/56
USPC ...... 172/29, 30, 272; 404/92, 101, 108, 109, 404/110
See application file for complete search history.

(56) References Cited

U.S. PATENT DOCUMENTS

| | | | |
|---|---|---|---|
| 2,169,987 A * | 8/1939 | Mosel | E01C 19/463 404/75 |
| 2,201,534 A | 5/1940 | Hallenbeck | |
| 2,243,983 A | 6/1941 | Shaw | |
| 2,244,414 A | 6/1941 | Arndt | |
| 2,244,480 A | 6/1941 | Arndt | |
| 2,403,820 A * | 7/1946 | Miller | E01C 19/4873 404/110 |

(Continued)

FOREIGN PATENT DOCUMENTS

| | | |
|---|---|---|
| WO | 2002099198 A1 | 12/2002 |
| WO | 2003046288 A1 | 6/2003 |
| WO | 2009051685 A2 | 4/2009 |

*Primary Examiner* — Gary S Hartmann
(74) *Attorney, Agent, or Firm* — David B. Tingey; Bryant J. Keller; Kirton McConkie

(57) ABSTRACT

The systems can include any suitable component that allows them to move material (e.g., gravel and/or another bulk material), under at least a portion of a frame or other portion of a vehicle, and from one portion of the vehicle to another portion. In some cases, the systems include a chip spreader that includes a motorized vehicle and a material transfer device that is configured to move the material from a first end of the motorized vehicle to a second end of the motorized vehicle. In some cases, the material transfer device is disposed below an axle, frame, drivetrain, radiator, and/or other component of an undercarriage of the motorized vehicle. In some cases, the material transfer device includes one or more conveyors, augers, vibrators, gravity slides, and/or pneumatic systems that are configured to move the material.

20 Claims, 12 Drawing Sheets

(56) References Cited

U.S. PATENT DOCUMENTS

| | | | | |
|---|---|---|---|---|
| 2,551,861 | A * | 5/1951 | Witte | A01D 78/04 172/30 |
| 2,914,995 | A * | 12/1959 | Odell | E01C 19/185 404/110 |
| 2,954,241 | A * | 9/1960 | Warren | E01C 19/4873 280/476.1 |
| 2,979,839 | A * | 4/1961 | Hugger | E01H 5/06 172/817 |
| 3,095,788 | A * | 7/1963 | Odell | E01C 19/185 404/110 |
| 3,299,642 | A * | 1/1967 | Feiner | E02B 7/06 405/107 |
| 3,685,405 | A * | 8/1972 | McDonald | E01C 19/4893 404/105 |
| 3,771,893 | A | 11/1973 | Miller | |
| 3,815,687 | A * | 6/1974 | Federspiel | E02F 3/627 172/817 |
| 3,997,276 | A | 12/1976 | Jackson, Sr. | |
| 4,018,540 | A | 4/1977 | Jackson, Sr. | |
| 4,390,304 | A | 6/1983 | Jacobson, Jr. et al. | |
| 5,006,012 | A | 4/1991 | Sterner | |
| 5,234,128 | A | 8/1993 | Hill | |
| 5,477,927 | A * | 12/1995 | Figura | A01B 45/02 172/29 |
| 5,697,731 | A * | 12/1997 | Bonds | E01C 19/00 172/815 |
| 5,865,563 | A * | 2/1999 | Bonds | E01C 19/00 404/108 |
| 6,161,986 | A | 12/2000 | Smith et al. | |
| 6,220,532 | B1 | 4/2001 | Manon et al. | |
| 6,659,376 | B2 | 12/2003 | Savard | |
| 7,798,744 | B2 | 9/2010 | Larson et al. | |
| 8,342,773 | B2 * | 1/2013 | Kropacek | E01C 19/52 404/101 |
| 8,578,635 | B2 * | 11/2013 | Hill | E01H 5/06 172/817 |
| 2009/0097918 | A1 | 4/2009 | Larson et al. | |
| 2009/0263193 | A1 * | 10/2009 | Mayer | E01C 19/48 404/110 |
| 2011/0211909 | A1 | 9/2011 | Pristupa et al. | |

\* cited by examiner

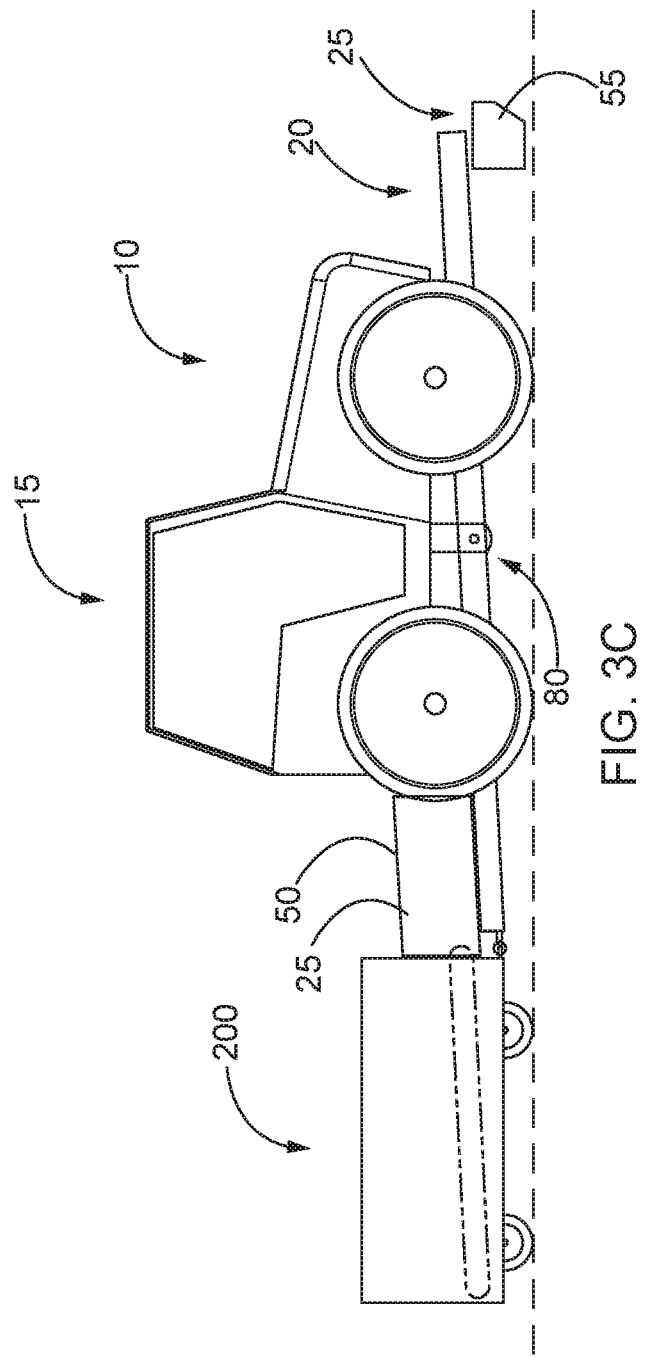

SYSTEMS AND METHODS FOR PROVIDING AN UNDERCARRIAGE MATERIAL HANDLING SYSTEM

RELATED APPLICATION

This non-provisional patent application claims priority to U.S. Provisional Patent Application Ser. No. 62/757,707, filed Nov. 8, 2018, and entitled SYSTEMS AND METHODS FOR PROVIDING AN UNDERCARRIAGE MATERIAL HANDLING SYSTEM; the disclosure of which is incorporated herein by reference in its entirety.

BACKGROUND OF THE INVENTION

Field of the Invention

The present invention relates to systems and methods for constructing and/or maintaining one or more roads and/or other similar surfaces. More particularly, some implementations of the described invention relate to systems and methods for moving gravel and/or another material from a first portion to a second portion of a vehicle. Specifically, in some implementations, gravel and/or any other suitable material is moved from a first end of a vehicle, under a frame, carriage, axle, and/or other component of the vehicle and is then released from a second end of the vehicle and spread onto a road and/or any other suitable surface. In some cases, the vehicle includes a chip spreader that includes a tractor, truck, and/or other vehicle that has a conveyor, auger, and/or other material handling system that is at least partially disposed below one or more portions of the vehicle, such as the vehicle's frame, carriage, axles, differentials, and/or other components.

Background and Related Art

Roads, bike paths, walkways, parking lots, and other pavement surfaces are used throughout much of the inhabited world. Moreover, the amount of pavement in the world is constantly increasing. While various types of pavement can have a relatively long lifespan, pavement does, nonetheless, deteriorate over time. As it can be relatively expensive to tear out decaying or damaged pavement and to replace it with new pavement, many people go to great lengths to repair and maintain existing pavement to further extend its lifespan. In this regard, many people seal cracks in pavement and/or resurface pavement.

Indeed, in some cases, a fresh layer of asphalt is applied over old pavement as an overlay. However, in some "hot-in-place" methods in which there are minimal cracks in a paved surface and the asphalt binder is soft enough to accept new asphalt, the asphalt on the paved surface is removed, reprocessed, and a refurbished asphalt mix is applied in its place. In another "mill-and-fill" method, damaged asphalt is milled, removed, and then replaced with fresh asphalt. In another "pre-coated chipping" method, asphalt is mixed with water and then applied to pavement. As the water in the liquid begins to evaporate, a layer of crushed gravel is applied and compacted into the asphalt.

While many conventional methods for constructing and/or maintaining pavement may be useful and may help to increase pavement lifespan, such methods are not necessarily without their shortcomings. Indeed, some conventional methods for repairing road surfaces and other types of pavement can be relatively dangerous—exposing workers to hot asphalt, dusts, debris, and other materials that can be hazardous to breathe or that can otherwise be dangerous to a person's health. Similarly, machinery can be exposed to such materials, and thereby have its lifespan shortened and/or require frequent repair. As another example, some methods for constructing and/or maintaining pavement can be relatively time consuming and expensive.

Thus, while systems and methods currently exist that are used to construct and/or maintain pavement, some challenges still exist, including those listed above. Accordingly, it would be an improvement in the art to augment or even replace current techniques with other techniques.

SUMMARY OF THE INVENTION

The present invention relates to systems and methods for constructing and/or maintaining one or more roads and/or other similar surfaces. More particularly, some implementations of the described invention relate to systems and methods for moving gravel and/or any other suitable material from a first portion to a second portion in relation to a vehicle. Specifically, in some implementations, gravel and/or another material is moved under a frame, carriage, axle, and/or other component of the vehicle and is then spread on to a road and/or any other suitable surface. In some cases, the vehicle includes a chip spreader that includes a tractor, truck, and/or other vehicle that has a conveyor, auger, and/or other material transfer device that is at least partially disposed below one or more portions of the vehicle, such as the vehicle's frame, carriage, rear axle, front axle, rear differential, front differential, drive shaft, and/or other components.

In some implementations, the described system comprises a chip spreader that includes: a motorized vehicle comprising a chassis and a drive mechanism; a material transfer device that is configured to move material from a first end (or portion) of the motorized vehicle to a second end (or portion) of the motorized vehicle; a first hopper (at the first end of the vehicle) that is configured to receive bulk material and dispense the bulk material to the material transfer device; and/or a second hopper (at the second end of the vehicle) that is configured to receive the bulk material from the material transfer device and to release the bulk material on to a surface that is below the vehicle. In some such implementations, the material transfer device is disposed below the chassis and/or drive mechanism such that as the material is moved from the first end to the second end of the motorized vehicle with the use of a transfer device, the material passing below the chassis and/or drive mechanism (e.g., drivetrain) of the vehicle.

While the material transfer device can be configured to raise and/or lower the material with respect to a surface on which the chip spreader sits, in some implementations, the described chip spreader is configured to only slightly raise and/or lower a displacement of the material as it moves from a first end to a second end (and/or between any other portions) of the material transfer device. For instance, in some cases in which the material transfer device comprises a conveyor and/or an auger, the conveyor and/or a longitudinal axis of the auger runs at an angle of between about 0 degrees and about ±45 degrees (or any subrange thereof) with respect to a flat surface when the chip spreader is sitting on such surface.

In some implementations, an angle of the material transfer device (e.g., an angle of a surface of a conveyor, a longitudinal axis of an auger, and/or another path that materials follows as they move along the material transfer device) is fixed with respect to a portion of the chip spreader (or other vehicle). In some other implementations, however, an angle of the material transfer device is configured to be selectively adjusted with respect to a portion of the chip spreader (e.g., a vehicle frame of the chip spreader). In this regard, the angle of the material transfer device can be adjusted in any suitable manner, including, without limitation, via one or more pivot joints, adjustable coupling mechanisms, hydraulic adjustment mechanisms, actuators, and/or in any other suitable manner.

In some implementations, the material transfer device is permanently coupled to a vehicle. In other implementations, the material transfer device is configured to be selectively coupled to and decoupled from the vehicle. Accordingly, implementations exist that allow the vehicle to be used for spreading material in a desired location, along with a wide variety of other uses.

While the methods and processes of the present invention may be particularly useful for repairing and/or maintaining roads and other paved surfaces, those skilled in the art will appreciate that the described systems and methods can be used in a variety of different applications and in a variety of different areas of manufacture. For instance, the described systems and methods can be used not only with chip spreaders, but some implementations of the described systems and methods are configured to be used in any other suitable location and/or application. Indeed, in some implementations in which a material transfer device (e.g., a conveyor belt, an auger, and/or any other suitable transfer device) is disposed below a portion of a vehicle, the transfer device can be used for any suitable purpose, including, without limitation, in food handling, providing feed at feed lots, harvesting crops, applying fertilizer, applying salt and/or ice-melt, applying pesticide, luggage handling, package handling, nuclear waste handling, railroad, landfill operation, and/or for any other suitable purpose.

These and other features and advantages of the present invention will be set forth or will become more fully apparent in the description that follows and in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above-recited and other features and advantages of the present invention are obtained, a more particular description of the described inventions will be rendered by reference to specific embodiments thereof, which are illustrated in the appended drawings. Understanding that the drawings are not necessarily drawn to scale or in proper proportion, and that the drawings depict only typical embodiments of the present inventions and are not, therefore, to be considered as limiting the scope of the inventions, the present inventions will be described and explained with additional specificity and detail through the use of the accompanying drawings in which:

FIG. 3C illustrates a side view of a vehicle comprising the undercarriage handling system in accordance with a representative embodiment;

DETAILED DESCRIPTION OF THE INVENTION

The present invention relates to systems and methods for constructing and/or maintaining one or more roads and/or other similar surfaces. More particularly, some embodiments of the described invention relate to systems and methods for moving gravel and/or another material from a first portion to a second portion of a vehicle. Specifically, in some embodiments, gravel and/or any other suitable material is moved from a first end of a vehicle, under a frame, carriage, axle, and/or other component of the vehicle, and is then released from a second end of the vehicle and spread on to a road and/or any other suitable surface. In some cases, the vehicle includes a chip spreader that includes a tractor, truck, and/or other vehicle that has a conveyor, auger, and/or other material handling system that is at least partially disposed below one or more portions of the vehicle, such as the vehicle's frame, carriage, axles, differentials, drive trains, transmissions, and/or other components.

As used herein, the terms material, bulk material, and variations thereof may refer to any solid, semi-solid, man-made material, and/or other suitable material that can be transferred from one portion of a vehicle to another with the described systems and methods. Some examples of such materials include, but are not limited to, gravel, crushed gravel, rock chips, rocks, asphalt, bituminous chips, asphalt mixed with water, aggregate, sand, granite, and/or any other suitable material. Indeed, some cases, the terms material or bulk material may refer to a non-liquid gravel, chips, coated chips, aggregate, and/or any other suitable particulate material.

As used herein, the term undercarriage and variations thereof may refer to a supporting framework underneath an automobile or trailer, or a structure to which the wheels are attached. In some cases, the term undercarriage and variations thereof may refer to the frame, chassis, drive train, front axle, rear axle, axle beam, drive shaft, transmission, gas tank, engine, and/or other similar components that are disposed (at least partially) on an underside of a vehicle and/or other suitable object (whether mobile or stationary). In some cases, the term undercarriage does not refer to any portion of a vehicle's wheels.

The following disclosure of the present invention is grouped into two subheadings, namely "Undercarriage Material Handling Systems" and "Representative Operating Environment." The utilization of the subheadings is for convenience of the reader only and is not to be construed as being limiting in any sense.

Undercarriage Material Handling Systems

Figure 1:
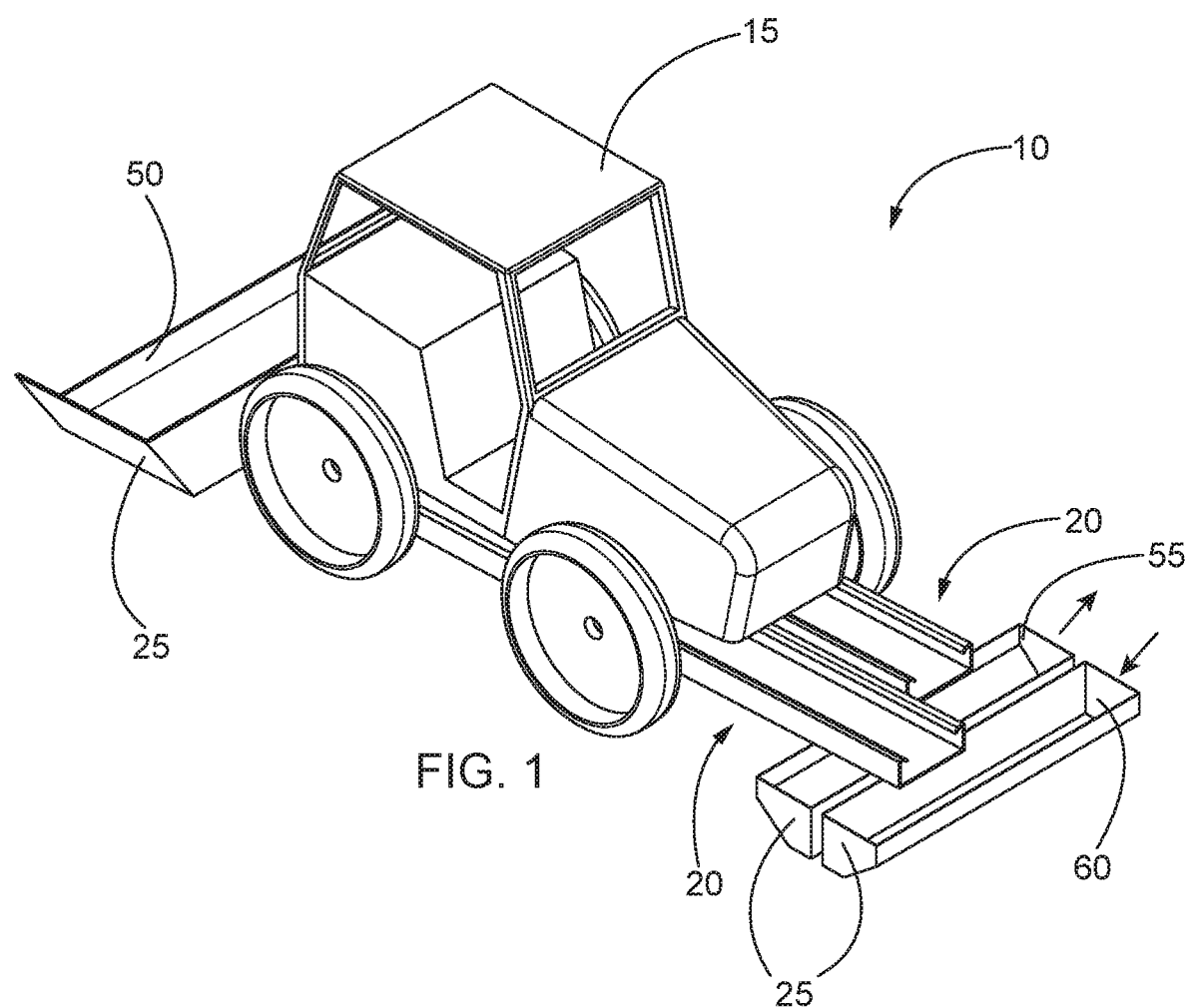
FIG. 1 illustrates a front perspective view of a vehicle comprising an undercarriage material handling system in accordance with a representative embodiment.

The described systems and methods for providing an undercarriage material handling system can comprise any suitable component that allows one or more materials to be moved from a first portion to a second portion of a vehicle, while being passed under at least part of the vehicle. In this regard, while some embodiments of the described system are configured to move material from any suitable location with respect to the vehicle to any other suitable location, in some embodiments, the system is configured to move the material from a back end (or back portion) to a front end (or front portion) of the vehicle (or vice versa). In any case, FIG. 1 show a representative embodiment in which the described undercarriage material handling system 10 comprises one or more vehicles 15, material transfer devices 20, hoppers 25, and/or other suitable components.

With respect to the vehicle 15, the described system 10 can be used with any suitable vehicle that is capable of holding at least a portion of the material transfer device 20 under at least a portion of an undercarriage of the vehicle (as discussed below). Some examples of such suitable vehicles include, but are not limited to, one or more: tractors, high clearance tractors, high-crop tractors, front-end loaders, backhoes, pieces of heavy machinery, on-highway trucks, off-highway trucks, articulated trucks, trucks, material handlers, vans, trailers, unimogs, diesel pushers, cars, buses, road sweepers, road reclaimers, skidders, utility vehicles, utility tractors, semi-tractors, track loaders, wheel loaders, and/or any suitable vehicle (whether self-propelled or whether moved by another vehicle) that is capable of being used with the described systems and methods. In some embodiments, the vehicle comprises a tractor (e.g., an agricultural or construction tractor). Indeed, in accordance with some embodiments, the tractor comprises a "high crop" tractor, such as a 5100MH OR 6155RH tractor as produced by John Deere of Moline, Ill., USA. In some other embodiments, the vehicle comprises a tractor produced by New Holland, Massey Ferguson, and/or any other tractor producer that manufactures a tractor with a suitable clearance and/or one or more other features that allow the system 10 to function as described herein.

The vehicle 15 can comprise any suitable vehicle that has adequate clearance below one or more axles, transmissions, engines, drive shafts, frames, chassis, frame cross members, differentials, drivetrains, and/or other components of the undercarriage to allow the material transfer device 20 to be disposed below such components and to function as described herein. In some embodiments, the vehicle comprises any suitable vehicle (e.g., tractor or other vehicle) that has between about 5 cm and about 3 m of clearance (or any subrange thereof) between a lowest part of its undercarriage under which a portion of the material transfer device is (or may be) disposed (e.g., the vehicle's rear differential, rear axle, front axle, engine, frame, frame cross members, motor (e.g., electric, diesel, gas, and/or otherwise), bumper, and/or any other part of a vehicle's undercarriage). Indeed, in some embodiments, the vehicle has an undercarriage clearance of about 0.79 m±0.2 m. In some other embodiments, the vehicle has an undercarriage clearance of at least 0.6 m.

In some embodiments, instead of being disposed on a vehicle 15, the material transfer device 20 (and/or other components of the system 10) is disposed on any other suitable structure, including, without limitation, a stationary structure, skid, pallet, framework, bed, shelf, rack, frame, trailer, cart, and/or any other suitable structure. Indeed, in some embodiments, one or more portions of the system are disposed on a framework that can be used in one place and/or attached to a vehicle (e.g., an undercarriage and/or any other suitable portion of the vehicle).

With respect to the material transfer device 20, the described system 10 can comprise any suitable material transfer device that is configured to be disposed under at least a portion of the vehicle 15 (e.g., under a portion of the vehicle's undercarriage) and to move gravel, rock chips, and/or any other suitable material from a first end to a second end and/or from any other suitable first portion of the vehicle to any other suitable second portion of the vehicle. In this regard, some examples of suitable material transfer devices include, but are not limited to, one or more conveyor belts, screw conveyors, chain conveyors, chain drag conveyors, bucket conveyors, apron conveyors, apron pan belts, pan conveyors, cable conveyors, magnetic-belt conveyors, troughed-belt conveyors, chute conveyors, ball conveyors, ball transfer conveyors, pneumatic conveyors, mechanical conveyors, slip stick conveyors, aero mechanical conveyors, flexible screw conveyors, rigid screw conveyors, screw conveyors, conveyors, vibratory tray feeders, vibratory feeders, shafted augers, shaftless augers, augers, augers, lifters, carousels, chutes, material transfer venturis, axial blowers, centrifugal blowers, radial blowers, blowers, fans, vacuum lifters, rotating-inclined drums, hoppers, agitator hoppers, live bottom hoppers, feeders, slides, chutes, inclined planes, and/or any other suitable mechanism that is configured to move materials from a first portion of a vehicle to a second portion of the vehicle as described herein.

Figure 5:
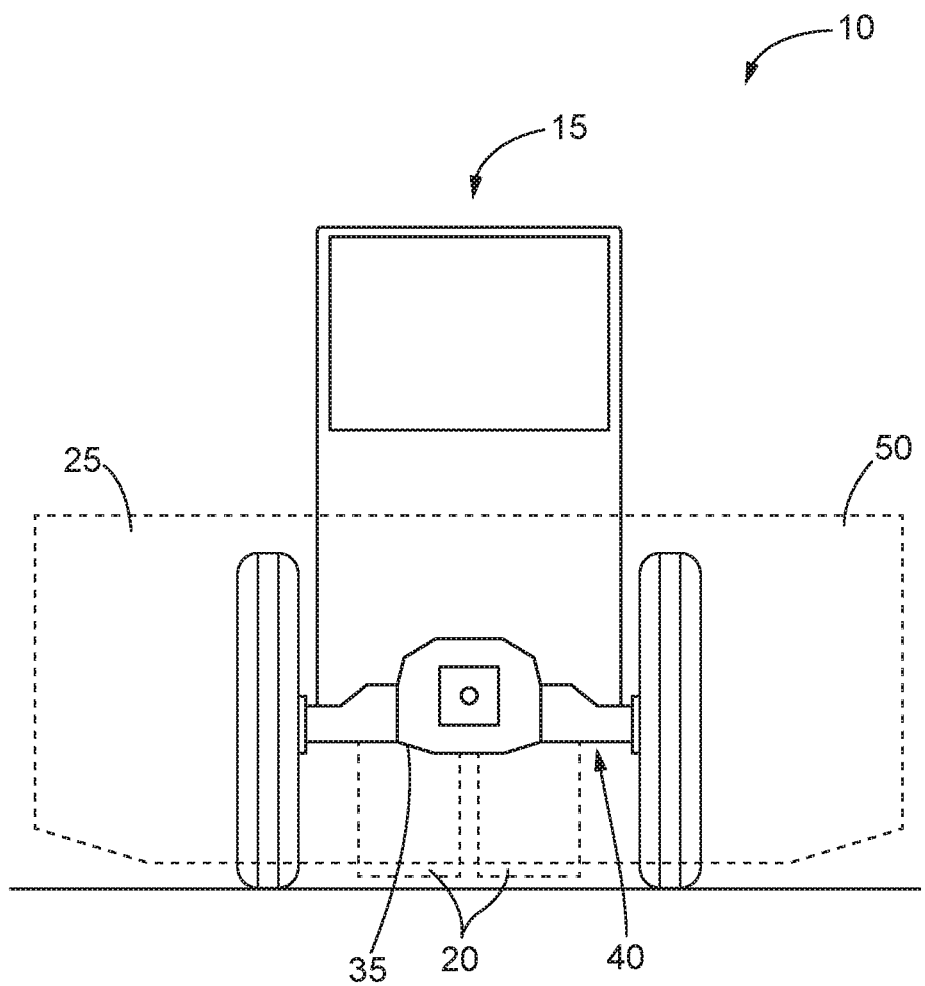
FIG. 5 illustrates a back side view of a vehicle comprising the undercarriage handling system in accordance with a representative embodiment.

In some embodiments, the material transfer device 20 comprises a conveyor (e.g., a system comprising one or more rotating belts, chains, cables, bands, air transfer conveyor mechanisms, scrapers, and/or other suitable conveyor components). In one non-limiting illustration, FIG. 5 shows an embodiment in which the material transfer device 20 comprises one or more conveyor belt systems 30.

Figure 3A:
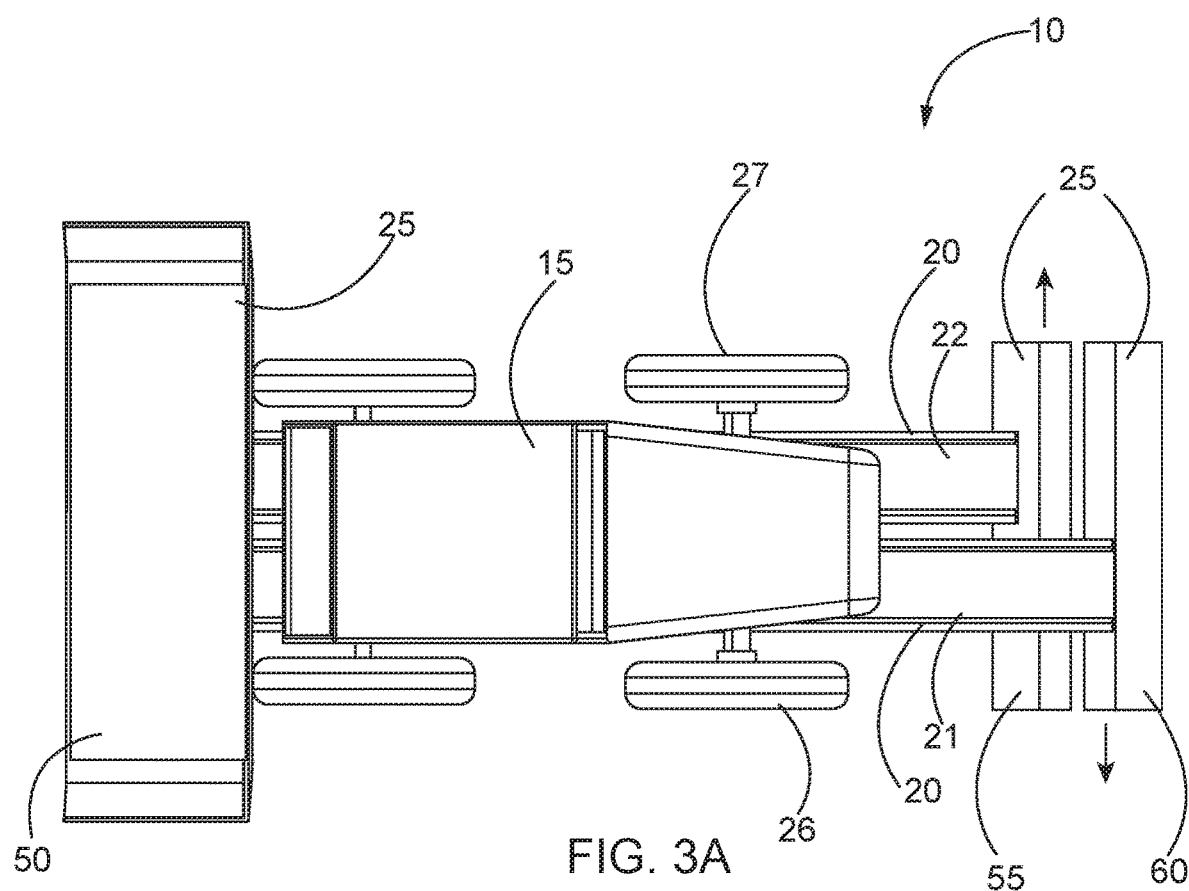
FIG. 3A illustrates a top view of a vehicle comprising the undercarriage handling system in accordance with a representative embodiment.
Figure 3B:
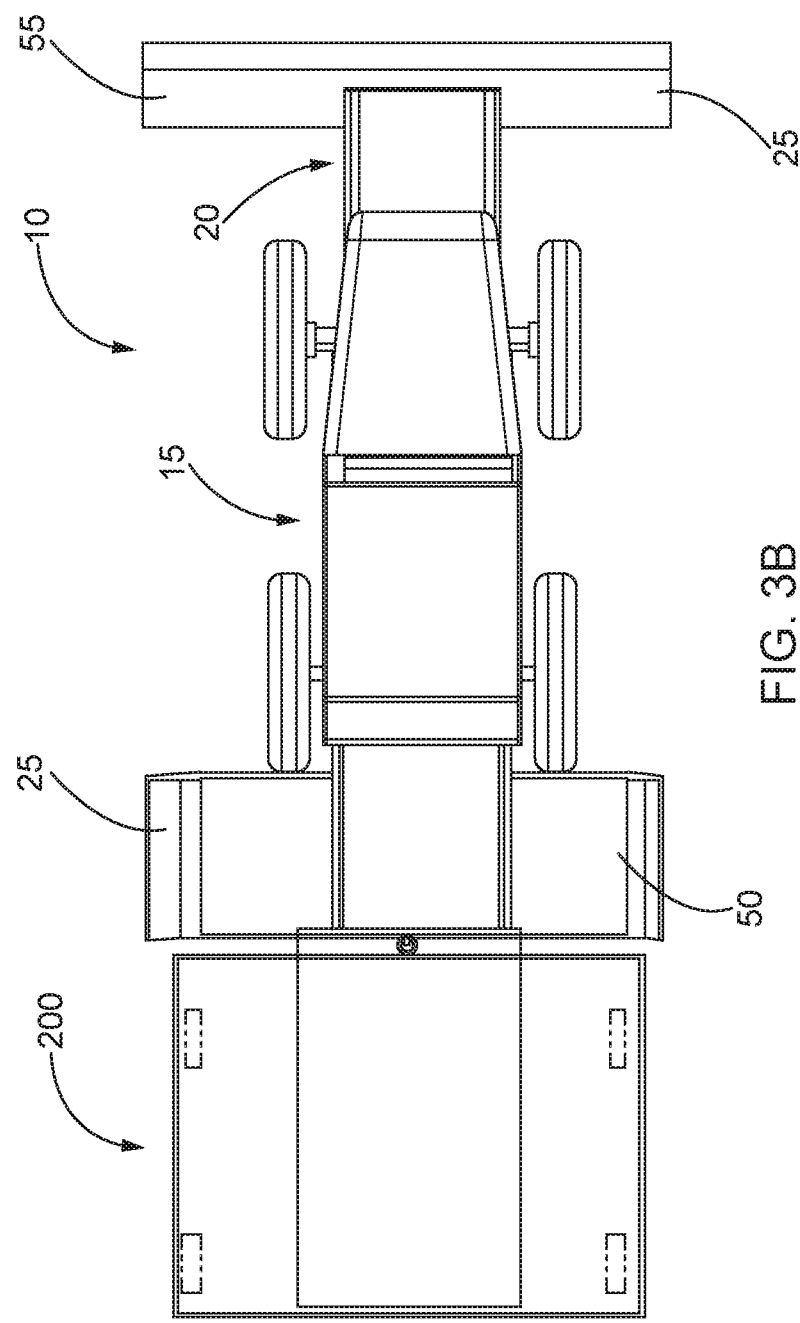
FIG. 3B illustrates a plan view of a vehicle comprising the undercarriage handling system in accordance with a representative embodiment.
Figure 4:
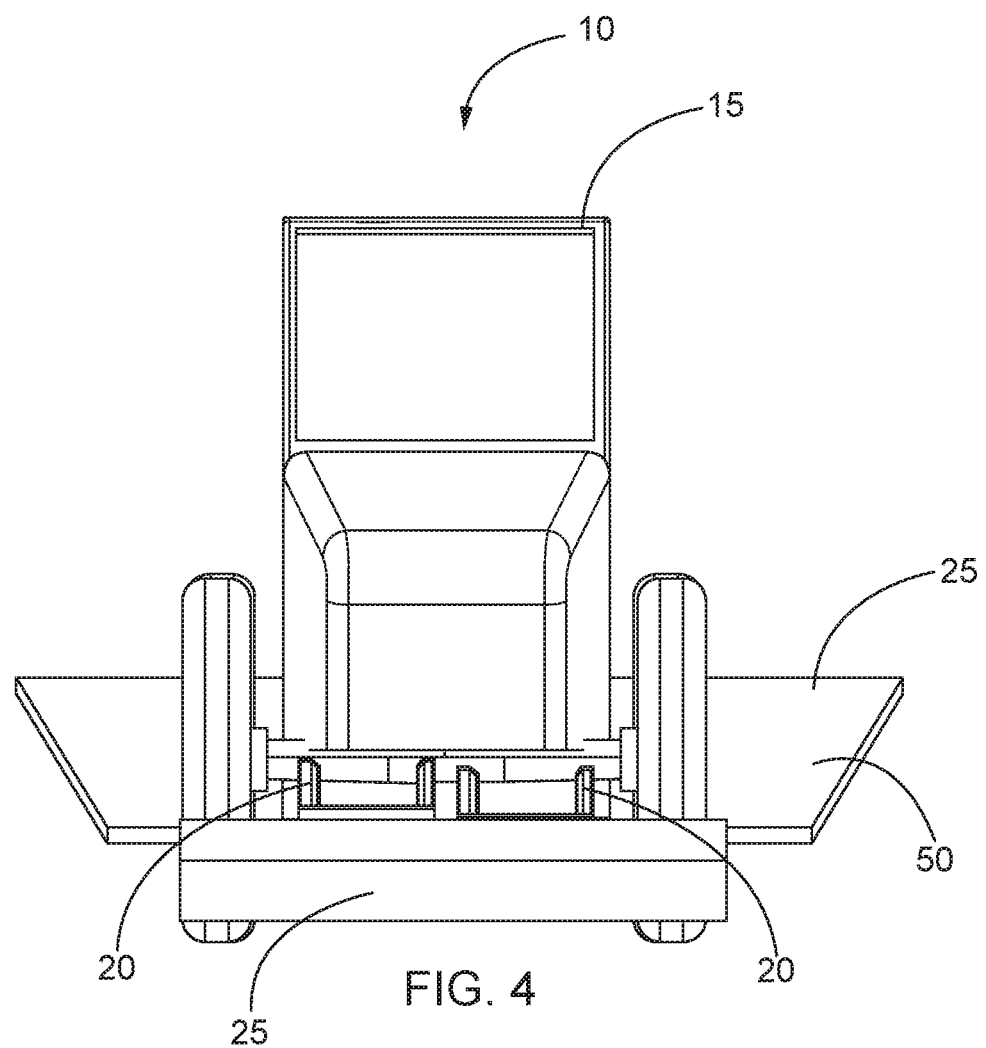
FIG. 4 illustrates a front side view of a vehicle comprising the undercarriage handling system in accordance with a representative embodiment.
Figure 7:
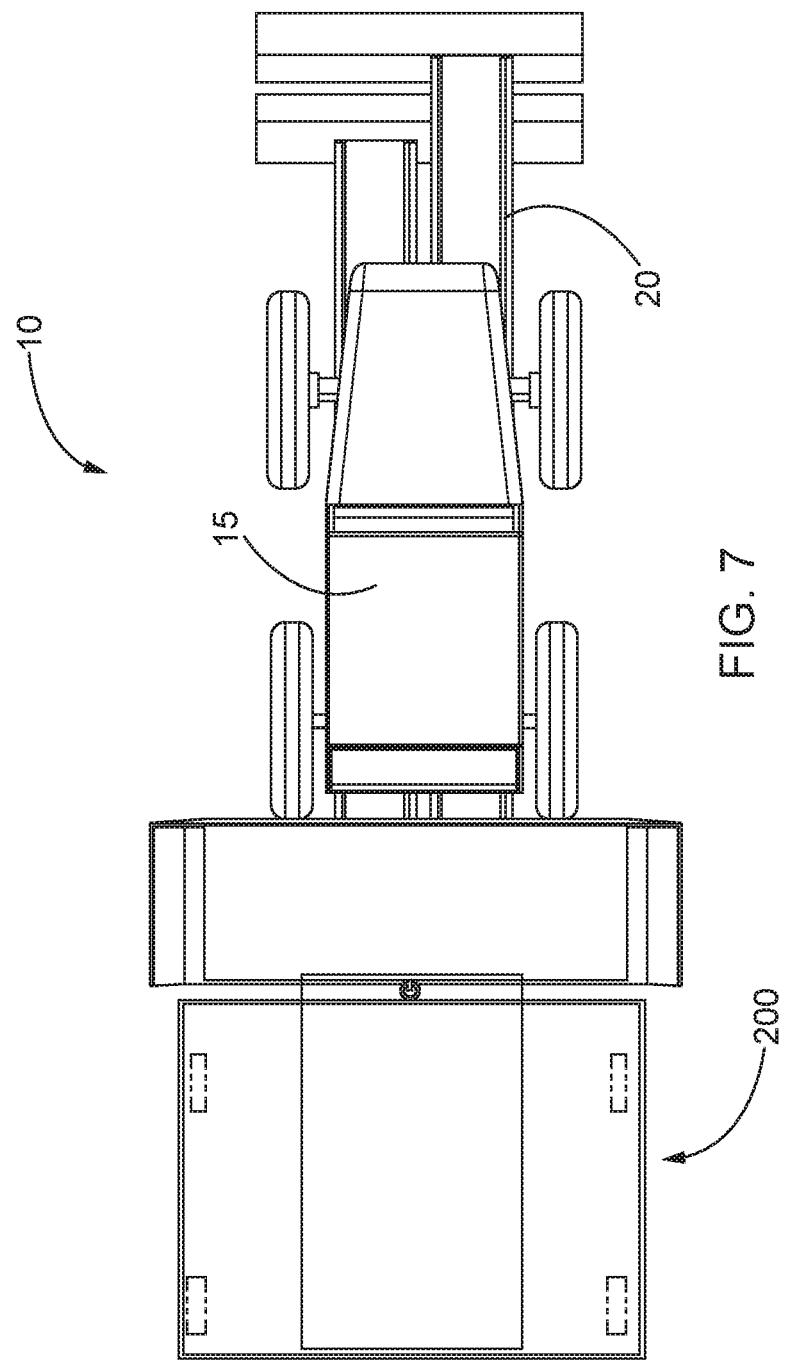
FIG. 7 illustrates a top plan view of a vehicle comprising the undercarriage handling system and a trailer in accordance with a representative embodiment.
Figure 8:
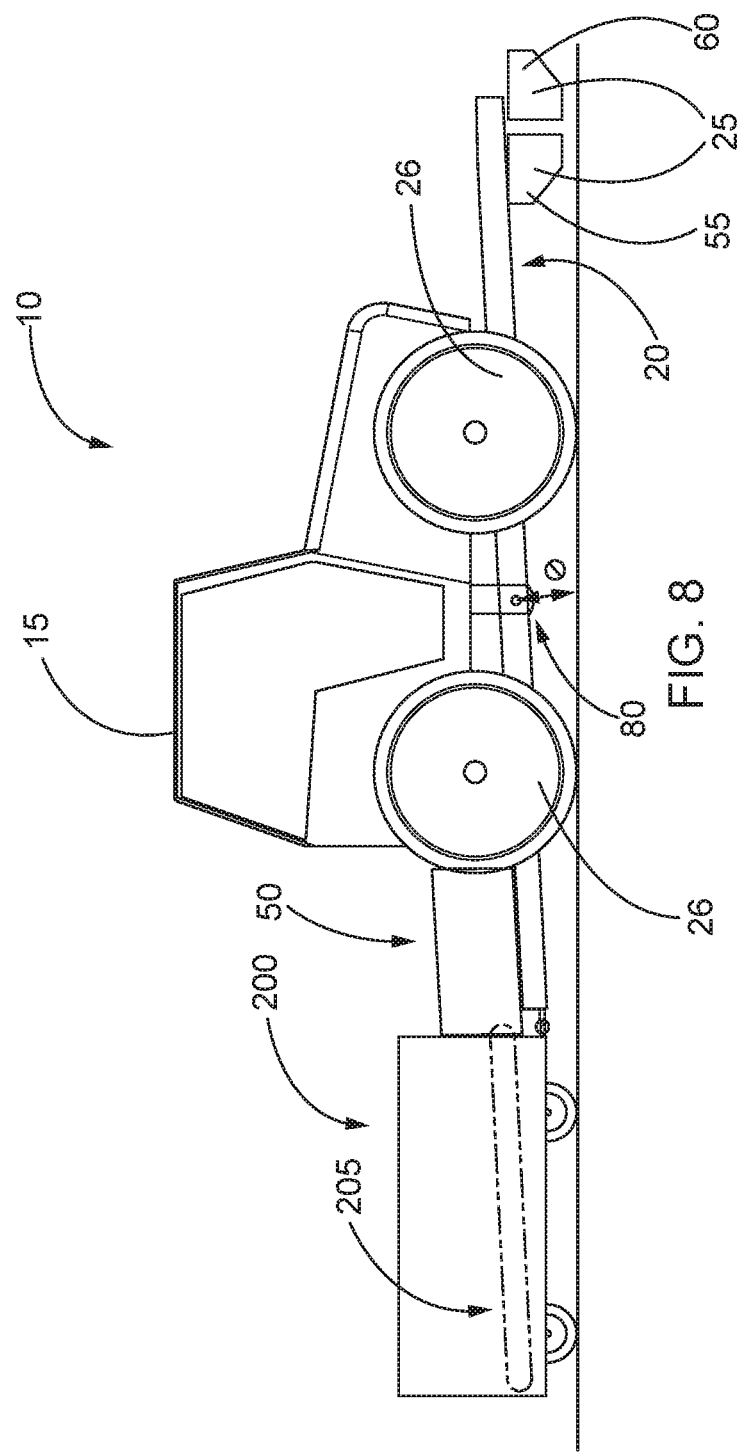
FIG. 8 illustrates a side view of a vehicle comprising the undercarriage handling system and a trailer in accordance with a representative embodiment.

In this regard, the described system 10 can comprise any suitable number of material transfer devices 20, including, without limitation, 1, 2, 3, 4, 5, 6, 7, 8, 9, 10, or more. Indeed, in some embodiments, the system comprises a single material transfer device (e.g., a single conveyor system, a single auger system, or any other suitable transfer device). In contrast, some other embodiments, comprise more than one material transfer system to: transfer the material in series (e.g., to pass the material through a daisy chain of transfer devices), to transfer the material to different locations (e.g., to different hoppers 25, to different sides of the vehicle, and/or to any other suitable locations), to transfer the material from one or more trailers (e.g., tow behind live bottom trailers 200, as shown in FIGS. 7-8, for added material capacity for feeding the rear hopper), to transfer material from one or more hoppers, and/or to perform any other suitable function. By way of non-limiting illustration, FIG. 3A shows an embodiment in which the system 10 comprises two transfer media devices 20 (e.g., conveyor systems 21 and 22) that are configured to transfer the material to different hoppers 25 (e.g., hoppers 55 and 60) at a front end (or any other suitable portion) of the vehicle 15. Additionally, FIGS. 3B-3C show some embodiments in which the system 10 comprises one transfer media device 20 that is configured to transfer the material from a hopper 25 (e.g., hopper 50) at a rear end, to a single hopper 25 (e.g., hopper 55) at a front end (or any other suitable portion) of the vehicle 15.

The material transfer device 20 can be powered in any suitable manner. In some embodiments, the transfer device is powered by one or more power take-offs (e.g., of the vehicle 15), hydraulic pumps, hydraulic actuators, pumps, motors (e.g., electric, gas, diesel, and/or otherwise), generators (e.g., powered off the power take-off and/or otherwise powered), alternators, batteries, engines, compressors, actuators, axial blowers, centrifugal blowers, radial blowers, blowers, hydrostatic drives, steam powered turbines, gravity, air, vibratory devices, movement of tires (e.g., being mechanically connected via one or more gears, chains, and/or otherwise to movement of tires (and/or another rotating component of the system 10) that turn as the vehicle moves), and/or any other suitable device or devices that are configured to actuate the material transfer device to (and/or to otherwise) move the material from one portion to another portion of the transfer device. In some embodiments, the transfer device comprises its own motor and/or other power source. In some other embodiments, however, the transfer device shares a motor and/or other power source with one or more other objects (e.g., vehicles 15, heated kettles, mixers, agitators, hoppers, vibrators, augers, and/or other suitable objects). Indeed, in some embodiments, the transfer device is powered by the vehicle's engine and/or motor (e.g., via the power take-off, via a generator, and/or in any other suitable manner).

The material transfer device 20 can be coupled to the vehicle 15 in any suitable manner, including, without limitation, by being permanently coupled to and/or by being selectively coupleable to, and removable from, the vehicle. In this regard, some examples of suitable methods for coupling the material transfer device to a vehicle include, but are not limited to, coupling the transfer device to the vehicle through the use of one or more pins, screws, bolts, welds, rivets, anchors, clips, clamps, cotter pins, frictional engagements, mechanical engagements, magnetic devices, quick-release-mechanisms, straps, bands, restraints, link and pin couplers, bar couplers, three-link couplers, screw couplers, buckeye/knuckle couplers, automatic couplers, couplers, catches, and/or other suitable mechanisms for coupling the transfer device to the vehicle.

Indeed, in some embodiments, the material transfer device 20 is bolted, welded, and/or otherwise coupled to the vehicle 15 so as to be permanently coupled to the vehicle, or at least to be relatively difficult to remove from the vehicle. In some other embodiments, however, the transfer device is (or the transfer devices are) coupled to the vehicle through the use of one or more clamps, pins, hangers, couplers, pivot joints, joints, and/or other mechanical engagements that allow the transfer device (or at least portions of the device) to be selectively removed from and to be coupled to the vehicle relatively easily. Indeed, in some embodiments, the material transfer device is coupled to the vehicle via one or more hangers with pins such that the device can be decoupled from the vehicle and the vehicle can be pulled away from (or otherwise be separated from) the transfer device so that the vehicle can be used for any other suitable purpose (e.g., for mowing, snow removal, pulling other equipment, plowing, planting, harvesting, and/or for any other suitable purpose). Thus, in some embodiments, the material transfer device is configured to be retrofitted to a vehicle.

As mentioned, the material transfer device 20 can be configured to move material under any suitable portion of the vehicle 15. Indeed, in some embodiments, the transfer device is coupled to the vehicle such that at least a portion of the transfer device is disposed between one or more wheels on a right side and one or more wheels on a left side of the vehicle. By way of illustration, FIG. 3A shows an embodiment in which two conveyors 21 and 22 are disposed between the right 26 and left 27 wheels of the vehicle 15.

Additionally, in some embodiments, at least a portion of the transfer device 20 is configured to pass underneath at least a portion of a: chassis, rolling chassis, vehicle frame, crossbar of a vehicle frame, frame, rear axle, front axle, body, bed, suspension, motor, coachwork, powertrain, engine, transmission, hydraulic system, generator, gear box, drive shaft, radiator, radiator fan, differential, running gear, cab, seat, cab floor, bumper, and/or any other suitable component of the vehicle. In some embodiments, however, a portion of the transfer device 20 that carries material passes under at least one axle of the vehicle.

Figure 2:
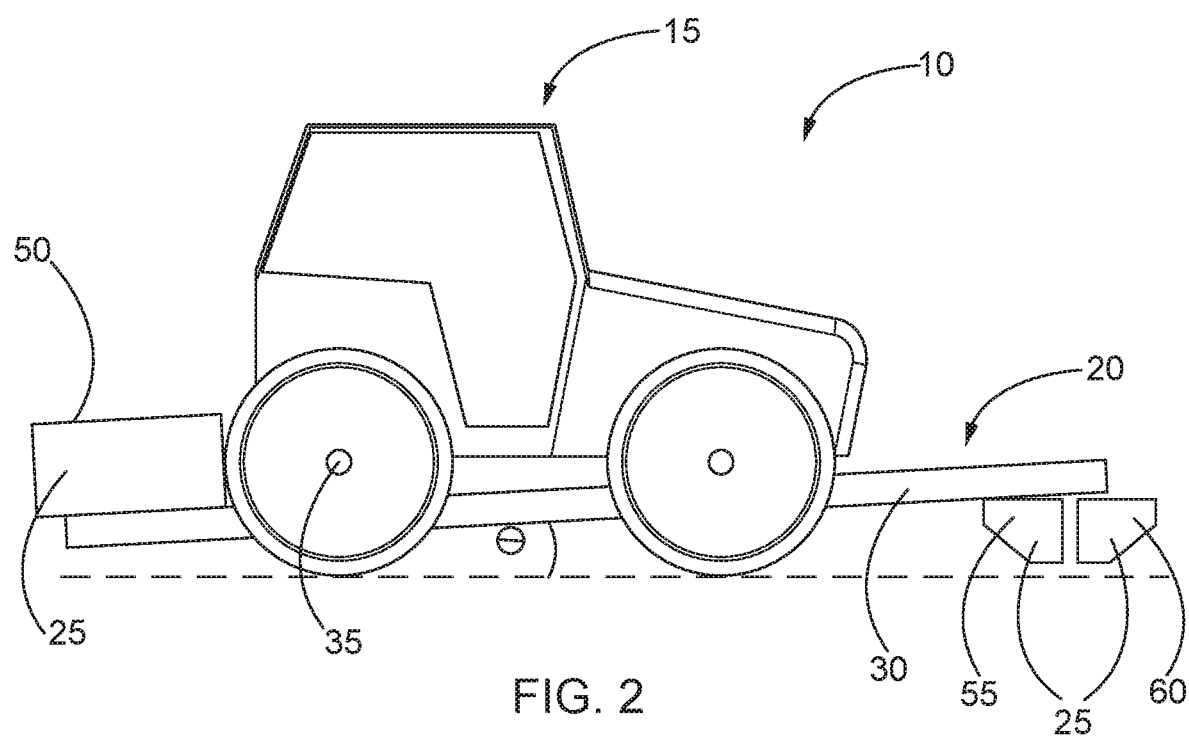
FIG. 2 illustrates a side view of a vehicle comprising the undercarriage handling system in accordance with a representative embodiment.
Figure 6:
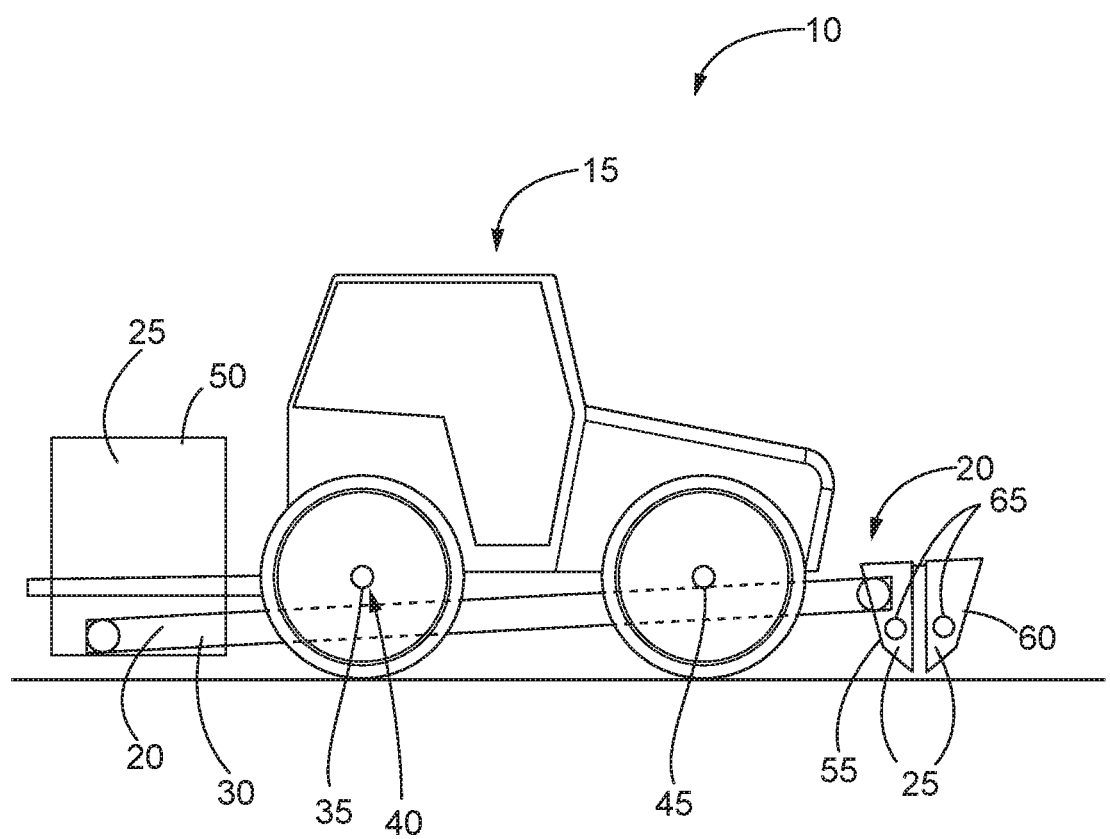
FIG. 6 illustrates a side view of a vehicle comprising the undercarriage handling system in accordance with a representative embodiment.

By way of non-limiting illustration, FIGS. 2, 5, and 6 show some embodiments in which a portion of the material transfer device 20 (e.g., a length of: a conveyor belt 30, an auger, and/or another transfer device that carries material) passes underneath at least one axle 35 of the vehicle 15. Indeed, while a portion of the material transfer device 20 (e.g., a conveyor, auger, and/or other device) can be disposed above one or more axles of the vehicle (e.g., above one axle and below another), FIG. 6 shows some embodiments in which a length of a conveyor belt 30 (and/or another suitable transfer device) passes underneath both a rear 40 and a front 45 axle of the vehicle 15. In this regard, the transfer device can pass under and/or over any suitable type of axle of the vehicle, including, without limitation, one or more rear, full floating, semi-floating, three-quarter floating, front, dead front, live front, stub, Elliot, reversed Elliot, lamoine, reversed lamoine, dead, live, lift, rigid drive, rigid type, two-wheel drive, four-wheel drive, steering drive, bow type, tractor, dropped gear boxes, drop-down, axle beam, stub, swinging type, spindled axle, axle drive shaft (e.g., of an independent suspension axle), and/or any other suitable type of axle or axles. Indeed, in some embodiments, a portion of the transfer device extends under the rear axle of the vehicle (e.g., a rear axle comprising a differential). Additionally, in some embodiments a portion of the transfer device (e.g., a portion of the device that supports or otherwise carries material from one end of the transfer device to another) is disposed under both a front axle and a rear axle of the vehicle.

When the material transfer device 20 is coupled to the vehicle 15, the transfer device can be configured to move the material at any suitable angle with respect to a plane of a surface on which the vehicle 15 rests when the vehicle is on a flat and level surface (or a plane that contacts a lowest portion of each of the vehicle's wheels). Indeed, in some embodiments, the transfer device is configured to be substantially level from its first end to its second end (and/or along its longitudinal axis). In some other embodiments, however, the height of a first end of the transfer device is higher or lower that the height of a second end of the transfer device. Thus, in some embodiments, the vehicle transfer device is configured to raise and/or lower the material as it moves the material from a first end to a second end of the material transfer device (or vice versa). While the first and second end of the transfer device can vary in height from each other by any suitable distance, in some embodiments, the first and second ends of the transfer device vary in height with respect to each other by any suitable distance between about 0 m and about 2 m, including any distance there between (e.g., between about 7.62 cm and about 1.22 m). Indeed, in some embodiments, the first and second ends of the transfer device vary in height with respect to each other (e.g., when the vehicle sits on a flat level surface) by between about 1 cm and about 0.5 m.

Said differently, in some cases in which a length of the material transfer device 20 comprises a substantially flat surface, a belt, a plane of movement, an axis of movement, a longitudinal axis, and/or other such surface, belt, plane of movement, axis, and/or longitudinal axis, such length of the material transfer device can run at any suitable angle with respect to a surface (e.g., a flat level surface) on which the system 10 is resting (or with respect to a portion of the vehicle). Indeed, in some embodiments, a length of the material transfer device is configured to run at an angle between about 0 degrees and about ±45 degrees (or within any subrange thereof) with respect to a flat surface on which the system is resting (and/or with respect to an underside, a portion of a frame, and/or any other suitable portion of the vehicle 15). In some particular embodiments, a length of the conveyor, auger, and/or other component of the transfer device runs at an angle of between about 0 degrees and about 20 degrees (or within any subrange thereof) with respect to a flat surface when the system is sitting on such surface. By way of non-limiting illustration, FIG. 2 shows an embodiment in which a length of the material transfer device 20 runs at an angle θ that is about 15 degrees (or less) from being completely level.

In some embodiments, an angle θ of the material transfer device 20 is permanently fixed with respect to the vehicle 15 and/or a surface on which the vehicle rests. In some other embodiments, however, the angle of the material transfer device is configured to be selectively adjustable with respect to a flat surface when the system is sitting on such surface (and/or any suitable portion of the vehicle). Accordingly, in some embodiments, the angle of the material transfer device can be modified for use with different hoppers 25, different vehicles, different jobs, different materials, and/or for any other suitable purpose.

Where an angle θ of the material transfer device 20 is configured to be selectively adjusted, such angle can be adjusted in any suitable manner. Indeed in some embodiments: the system 10 comprises one or more actuators (e.g., hydraulic actuators, chain-driven actuators, geared actuators, screw actuators, linear actuators, manual actuator mechanisms, motors, and/or any other suitable system or systems) that are configured to selectively vary an angle of a portion of the material transfer device, a portion of the material transfer device is coupled to a joint such that the transfer device can pivot or otherwise rotate (to at least some degree) about such joint; a first end or portion of the transfer device is configured to couple to the vehicle at a plurality of different heights (e.g., via one or more straps, couplers, pins, and/or other suitable coupling mechanisms) while a second end of the transfer device is configured to couple to the vehicle in a single position or height; a second end or portion of the transfer device is configured to couple to the vehicle at a plurality of different heights (e.g., via one or more straps, couplers, pins, and/or other suitable coupling mechanisms) while a first end of the transfer device is configured to couple to the vehicle in a single position or height; a first end or portion of the transfer device is configured to couple to the vehicle at a plurality of different heights (e.g., via one or more straps, couplers, pins, and/or other suitable coupling mechanisms) while a second end of the transfer device is also configured to couple to the vehicle at a plurality of different heights (e.g., via one or more straps, couplers, pins, and/or other suitable coupling mechanisms); and/or in any other suitable manner.

By way of non-limiting illustration, FIG. 8 shows an embodiment in which the material transfer device 20 is coupled to an underside of the vehicle 15 via a first pivot joint 80 (e.g., a strap and corresponding pin and/or any other suitable pivot joint). In some such embodiments, the system 10 comprises one or more pivot joints and/or other couplers that couple a different portion (e.g., a second portion) of the transfer device to the vehicle to fix an angle θ of the transfer device. In this regard, while such additional pivot joint or joints are not shown in FIG. 8, they can be disposed in any suitable location, including, without limitation, at a front end, a back end, and/or any other suitable portion of the vehicle (e.g., being blocked from view in FIG. 8 by the tires 26).

With respect to the hoppers 25, the system 10 can comprise any suitable receptacle, repository, funnel, chute, container, vessel, twin hopper system, multi-hopper system, and/or other suitable hopper that is configured to receive material (e.g., gravel) and to direct that material to the material transfer device 20 and/or that is configured to direct material from the transfer device to a desired surface (e.g., a road, track, and/or other surface). Indeed, in some embodiments, the hopper comprises one or more receptacles that are configured to receive material (e.g., gravel, rock chips, etc.) from a bucket, shovel, front end loader, conveyor belt, one or more of a series (e.g., a train) of live bottom (conveyor) trailers attached at a rear (and/or in any other suitable location) for added capacity, dump truck, truck, and/or any other source. By way of non-limiting illustration, FIGS. 1-4 and 6 show some embodiments in which a back end of the vehicle 15 comprises a first hopper 50 that is configured to receive material (e.g., gravel) and to feed and/or otherwise provide that material to the transfer device 20.

Additionally, FIG. 8 shows an embodiment in which the vehicle 15 pulls one or more trailers comprising one or more additional hoppers 200 (e.g., live bottom hoppers). In this regard, while FIG. 8 shows an embodiment in which the vehicle 15 pulls one live bottom hopper, the system 10 can be modified to include any other suitable number of live bottom (or any other suitable type of) hoppers, including, without limitation, 2, 3, 4, 5, 6, 7, 8, 9, 10, or more. Additionally, while the live bottom hopper of FIG. 8 comprises a conveyor system 205, the live bottom hopper can comprise any other suitable type of transfer mechanism, including, without limitation, any suitable type of transfer device (e.g., as described herein). Moreover, where the system comprises one or more live bottom hoppers, the transfer mechanism (or mechanisms) of such hoppers can be powered in any suitable manner, including, without limitation, any of the mechanism that are described herein for use in powering the material transfer device 20.

In some embodiments, the system 10 further comprises one or more hoppers 25 that are configured to receive material (e.g., gravel or chips) from the material transfer device 20 and to then dispense such material to a desired surface (e.g., a road) and/or to any other suitable location.

By way of non-limiting illustration, FIGS. 1-4, 6, and 8 show some embodiments in which the system 10 comprises two hoppers 55 and 60 at a front end of the vehicle 15 that are configured to spread material (e.g., gravel) onto a road surface. In this regard, while the drawings show that some embodiments of the system 10 comprise three hoppers 25 (e.g., hoppers 50, 55, and 60), the system 10 can comprise any other suitable number of hoppers 25. Indeed, in some embodiments, the system comprises 1, 2, 4, 5, 6, 7, 8, 9, 10, or more.

Where the system 10 comprises one or more hoppers 25, the hoppers can comprise any suitable component and characteristic that allows one or more hoppers to receive material and to provide such material to the transfer device 20 and/or that allows at least one hopper to receive material from the transfer device and to dispense such material to a surface. By way of non-limiting example, some embodiments of the hoppers comprise one or more mixers, agitators, valves, chutes, doors, scales, augers, vibrators, actuators, shrouds, conveyors, misters, and/or other components that allow the hoppers to function as described herein. Indeed, in some embodiments, one or more of the hoppers comprise a system (e.g., an agitator, auger, valve, chute, closure mechanism, opening mechanism, and/or any other suitable component) that helps feed material from the hopper and/or that controls the amount of material that is dispensed from the hopper. In this regard, FIG. 6 shows an embodiment in which the front hoppers 55 and 60 each comprise an auger 65 and/or agitator that is configured to ensure that a substantially equal amount of material is dispensed across a length of each of the hoppers.

In some embodiments, one or more of the hoppers 25 are configured to be selectively and/or automatically raised and/or lowered and/or to be selectively moved sideways from one location to another (e.g., being moved side to side, backward, forward, at a diagonal, and/or in any other suitable direction). By way of non-limiting illustration, FIG. 1 shows that, in some embodiments, the front hoppers 55 and 60 are configured to be moved horizontally (e.g., as illustrated by the arrows) to increase and/or decrease a width of the hoppers' path of material dispersion. Indeed, in some embodiments, one or more of the hoppers is configured to retract, extend, raise, lower, and/or otherwise move for transport and/or use.

Where the hoppers 25 are configured to be moved, the hoppers can be moved in any suitable manner that allows the system to function as described herein. Indeed, in some embodiments, one or more hoppers are configured to move (e.g., automatically, manually, as controlled by a user, as controlled by a speed of the vehicle 15, as controlled computer processor and sensors, as controlled by a program, as determined based on the surface to which the material is being applied, and/or in any other suitable manner) via one or more hydraulic actuators, actuators, linear actuators, screw actuators, solenoids, motors (e.g., gas powered, electric, diesel powered, and/or any other suitable motors), engines, generators, geared mechanisms, manually actuated mechanisms, motorized mechanisms, PLUS ONE™ and/or equal control systems, and/or other suitable mechanisms that are configured to move such hopper or hoppers. Indeed, in some embodiments, the front hoppers 55 and 60 are configured to be moved by one or more hydraulic (and/or any other suitable type of) actuators.

In addition to the aforementioned components, the described system 10 can have any other suitable component that allows it to function as intended. In one example, some embodiments of the system optionally comprise one or more computers or other processing units that are configured to help track, modify, record, locate, optimize, determine a load of, monitor, and/or otherwise control the system and/or its functions (e.g., the transfer device 20 speed, the angle of the transfer device, when the transfer device is actuated and stopped, the amount of material released from the hoppers 25, the timing when the hoppers release material, the position of the hoppers 25, the function of one or more live bottom hoppers 200, and/or any other suitable portion of the system). Indeed, in some embodiments, such a processing unit (e.g., as discussed below) is configured to raise and/or lower one or more portions of the transfer device, to move one or more of the hoppers from side to side, to control a speed of the transfer device, to control an amount of material delivered by the transfer device, to increase and/or decrease the amount of material that is dispensed from the system as the vehicle 15 speeds up or slows down (e.g., to ensure that a substantially equal amount of material is applied to a desired surface, despite variations in the speed of the vehicle), to control material delivery rate based on vehicle speed, to control material delivery based one or more or more specific requirements, to control individual gates, chutes, valves, augers, agitators, and/or other elements of the hoppers 25, to regulate spread width and/or material distribution, and/or to perform any other suitable function.

In another example, some embodiments of the system 10 comprise one or more sensors that are configured to help the system function as intended. Indeed, in some embodiments, the system comprises one or more cameras, proximity sensors, GPS sensors, location sensors, remote control capabilities, scales, button sensors, paddle sensors, noise sensors, dust and particulate sensors, and/or other suitable sensors to help: guide the vehicle 15, ensure that material is evenly distributed from the hoppers 25, ensure that material is applied to all of a desired surface, identify locations of a surface (e.g., road) that have not received material, determine an amount of material that is delivered by the system, automate the vehicle's functions, spray water to reduce breathable dust, take action to fix any material jam, and/or to otherwise help the system accomplish any other suitable function.

Indeed, some embodiments of the described system 10 comprise one or more cameras for viewing, radar for scanning, proximity sensors, and/or other sensors for identifying surrounding work areas of the vehicle. Thus, in some such embodiments, the cameras (and/or other sensors) can help the system be safer to operate and/or be around during operation. Additionally, in some embodiments, by having one or more cameras and/or monitors, some embodiments of the described system can further reduce the number of people needed to safely operate the system.

Although some embodiments of the system 10 do not comprise a cab, some other embodiments of the system 10 optionally comprise one or more cabs (e.g., climate-controlled cabs and/or any other suitable type of cab). Thus, unlike some competing devices that have no enclosed cab, some embodiments of the described system can regulate an operator's ambient temperature, reduce noise for an operator, reduce dust for an operator, improve ease of control for the operator, and/or otherwise make operation of the system safer and more comfortable for an operator.

In still another example, some embodiments of the described system comprise one-wheel, two-wheel, four-wheel, six-wheel, eight-wheel, and/or all-wheel drive. Indeed, unlike some competing systems that only comprise two-wheel drive, some embodiments of the current system comprise four-wheel and/or all-wheel drive. Thus, some embodiments of the current system can handle driving conditions better than some competing systems.

As another example, the system 10 comprises one or more dust containment enclosures (e.g., to cover any suitable portion of the material transfer device 20 and/or one or more of the hoppers 25); noise dampers (e.g., insulation, foam, noise baffles, and/or any other material or component that is capable of reducing noise that is produced as the material is moved from a hopper to the transfer device and vice versa); misters and/or wetting systems (e.g., to keep dust in the system); heaters (e.g., to heat the material and/or the surface to which the material is being applied); blowers (e.g., to channel dust from the material in a desired direction); vacuums (e.g., to collect dust from the material, to pick up excess material from a surface, and/or for any other suitable purpose); brushes and/or any other suitable type of sweeps (e.g., to pick up loose material); lifts, jacks, stabilizers, hydraulics, and/or other devices that are configured to help raise and lower the transfer device 20 to couple and decouple the device from the vehicle; and/or any other suitable component that is configured to function with the described system.

The various components of the described system 10 (e.g., the material transfer device 20, the hoppers 25, etc.) can comprise any suitable material, including, without limitation, one or more types of metal (e.g., one more types of steel, aluminum, and/or any other suitable metal), metal alloys, ceramics, fiberglass, plastics (e.g., polyethylene, high density polyethylene plastic, ultra-high-molecular-weight polyethylene, polypropylene, polyvinyl chloride, PVC sheet board, and/or any other suitable plastics), rubbers, polymers, pre-preg. aramid fibers, woods, carbon fibers, natural materials, synthetic materials, ultra-high-molecular weight (UHMW) materials (e.g., ultra-high-molecular weight polyethylene and/or other UHMW materials), and/or any other suitable materials. Indeed, in some embodiments, the hoppers 25 and/or transfer device 20 comprise one or more types of steel and/or rubber (e.g., in a conveyor belt).

The described system 10 can also be made in any suitable manner. In this regard, some non-limiting examples of methods for making the described system include, cutting, folding, bending, molding, shaping, extruding, drilling, using a computer numerical control device, connecting various pieces with one or more adhesives, mechanical fasteners (e.g., clamps, rivets, crimps, pins, brads, nails, staples, pegs, clips, screws, bolts, threaded attachments, couplers, etc.), 3D printing, additive manufacturing, welding pieces together, connecting pieces together, and/or any other suitable method that allows the described system to perform its intended functions.

In addition to the aforementioned features, the described system 10 can have any other suitable feature. Indeed, in some embodiments, the system can improve vehicle 15 operation, reduce maintenance, and/or extend the life of the vehicle. Indeed, some competing systems move material (e.g., gravel) over an engine, motor, transmission, radiator, radiator fan, air intake, intake system, axle, differential, drive shaft, and/or other components of the vehicle. In some such competing systems, materials (e.g., gravel) can spill and/or otherwise fall into such components and thereby damage the components. In contrast, some embodiments of the described system 10 are configured to run material below one or more important components of the system (e.g., as discussed above) so that spillage falls to the ground (and not into the important components).

As another example, by having the material transfer device 20 run below one or more components of the vehicle 15 (e.g., one or more axles, transmissions, engines, motors, and/or other components), some embodiments of the described system 10 allow an operator to be exposed to less noise, dust, debris, and/or material as the operator operates the vehicle. Thus, some embodiments of the described system can make material delivery less hazardous for an operator's ears, lungs, throat, eyes, nose, and health in general.

As still another example, by having a portion of the material transfer device 20 be relatively level, run at a relatively small angle, and/or otherwise only need to raise (and/or lower) material by a relatively small distance from one end of the transfer device to another, some embodiments of the system 10 are able to use relatively small amounts of power, relatively small motors, relatively little fuel, relatively little hydraulic motor torque, and/or less power than some competing systems. Accordingly, some embodiments of the current system can be relatively inexpensive to produce and/or operate. Additionally by dropping materials a shorter distance, some embodiments of the current system are (as described above) less dusty and/or quieter.

As another example, because some embodiments of the described system 10 have the material transfer device 20 disposed below an undercarriage (and/or other suitable component of the system) where it does little to block an operator's field of view, some such embodiments are configured to be operated by a single operator (unlike some competing systems that require two or more people to operate them). Similarly, because some embodiments of the system comprise one or more cameras, sensors, radars, proximity sensors, GPS sensors, monitors, automatic breaking systems, communication devices (e.g., headphones and/or any other suitable communication system), and/or other suitable features, such embodiments of the system can be operated with a single operator.

As yet another example, some embodiments of the described system 10 comprise one or more PLUS ONE™ operating systems, murphy operating systems, and/or any other suitable operating system. Indeed, in some embodiments, the system comprises an operating system that is configured to interface with a control system of the vehicle (e.g., such that one or more components of the system can be controlled by (or can be used in an optimal manner with) the vehicle control system).

Representative Operating Environment

The described undercarriage material handling system 10 can be used with or in any suitable operating environment and/or software. In this regard, FIG. 9 and the corresponding discussion are intended to provide a general description of a suitable operating environment in accordance with some embodiments of the described systems and methods. As will be further discussed below, some embodiments embrace the use of one or more processing (including, without limitation, micro-processing) units in a variety of customizable enterprise configurations, including in a networked configuration, which may also include any suitable cloud-based service, such as a platform as a service or software as a service.

Some embodiments of the described systems and methods embrace one or more computer readable media, wherein each medium may be configured to include or includes thereon data or computer executable instructions for manipulating data. The computer executable instructions include data structures, objects, programs, routines, or other program modules that may be accessed by one or more processors, such as one associated with a general-purpose processing unit capable of performing various different functions or one associated with a special-purpose processing unit capable of performing a limited number of functions. In this regard, in some embodiments, the processing unit (e.g., as mentioned above) comprises a specialized processing unit that is configured for use with the described system 10.

Computer executable instructions cause the one or more processors of the enterprise to perform a particular function or group of functions and are examples of program code means for implementing steps for methods of processing. Furthermore, a particular sequence of the executable instructions provides an example of corresponding acts that may be used to implement such steps.

Examples of computer readable media (including non-transitory computer readable media) include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing unit.

Figure 9:
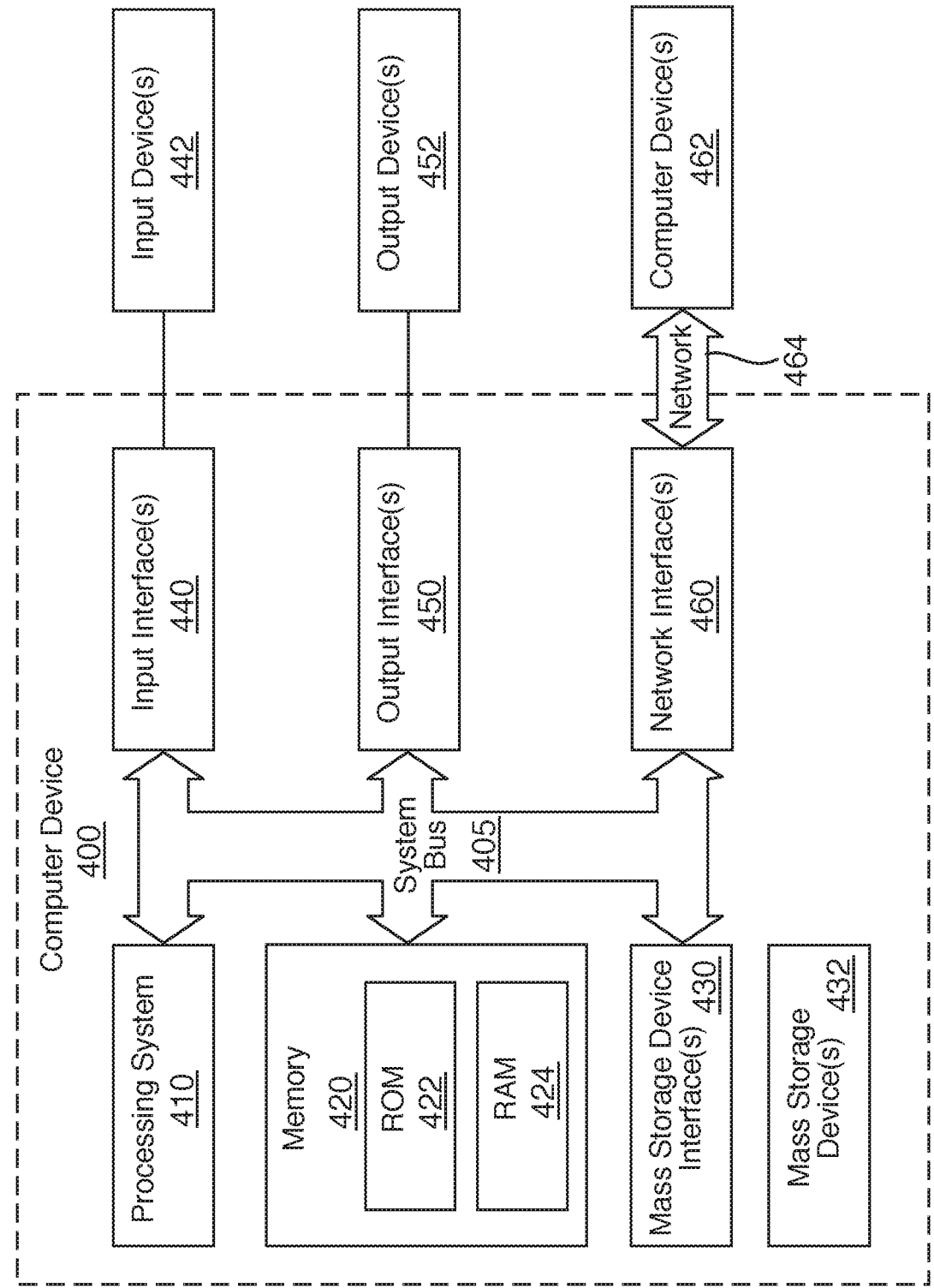
FIG. 9 illustrates a representative system that provides a suitable operating environment for use with some embodiments of the undercarriage material handling system.

With reference to FIG. 9, a representative system includes computer device 400 (e.g., a touch screen computer, an in-dash user interface, a handheld device, and/or other unit), which may be a general-purpose or special-purpose computer (or processing unit). For example, computer device 400 may be a personal computer, a notebook computer, a PDA or other hand-held device, a workstation, an in-dash user interface, a minicomputer, a mainframe, a supercomputer, a multi-processor system, a network computer, a processor-based consumer device, a cellular phone, a tablet computer, a smart phone, a feature phone, a smart appliance or device, a control system, or the like.

Computer device 400 includes system bus 405, which may be configured to connect various components thereof and enables data to be exchanged between two or more components. System bus 405 may include one of a variety of bus structures including a memory bus or memory controller, a peripheral bus, or a local bus that uses any of a variety of bus architectures. Typical components connected by system bus 405 include processing system 410 and memory 420. Other components may include one or more mass storage device interfaces 430, input interfaces 440, output interfaces 450, and/or network interfaces 460, each of which will be discussed below.

Processing system 410 includes one or more processors, such as a central processor and optionally one or more other processors designed to perform a particular function or task. It is typically processing system 410 that executes the instructions provided on computer readable media, such as on the memory 420, a magnetic hard disk, a removable magnetic disk, a magnetic cassette, an optical disk, or from a communication connection, which may also be viewed as a computer readable medium.

Memory 420 includes one or more computer readable media (including, without limitation, non-transitory computer readable media) that may be configured to include or includes thereon data or instructions for manipulating data, and may be accessed by processing system 410 through system bus 405. Memory 420 may include, for example, ROM 422, used to permanently store information, and/or RAM 424, used to temporarily store information. ROM 422 may include a basic input/output system ("BIOS") having one or more routines that are used to establish communication, such as during start-up of computer device 400. RAM 424 may include one or more program modules, such as one or more operating systems, application programs, and/or program data.

One or more mass storage device interfaces 430 may be used to connect one or more mass storage devices 432 to the system bus 405. The mass storage devices 432 may be incorporated into or may be peripheral to the computer device 400 and allow the computer device 400 to retain large amounts of data. Optionally, one or more of the mass storage devices 432 may be removable from computer device 400. Examples of mass storage devices include hard disk drives, magnetic disk drives, tape drives, solid state mass storage, and optical disk drives.

Examples of solid state mass storage include flash cards and memory sticks. A mass storage device 432 may read from and/or write to a magnetic hard disk, a removable magnetic disk, a magnetic cassette, an optical disk, or another computer readable medium. Mass storage devices 432 and their corresponding computer readable media provide nonvolatile storage of data and/or executable instructions that may include one or more program modules, such as an operating system, one or more application programs, other program modules, or program data. Such executable instructions are examples of program code means for implementing steps for methods disclosed herein.

One or more input interfaces 440 may be employed to enable a user to enter data (e.g., initial information) and/or instructions to computer device 400 through one or more corresponding input devices 442. Examples of such input devices include a keyboard and/or alternate input devices, such as a digital camera, a sensor, bar code scanner, debit/credit card reader, signature and/or writing capture device, pin pad, touch screen, mouse, trackball, light pen, stylus, or other pointing device, a microphone, a joystick, a game pad, a scanner, a camcorder, and/or other input devices. Similarly, examples of input interfaces 440 that may be used to connect the input devices 442 to the system bus 405 include a serial port, a parallel port, a game port, a universal serial bus ("USB"), a firewire (IEEE 1394), a wireless receiver, a video adapter, an audio adapter, a parallel port, a wireless transmitter, or another interface.

One or more output interfaces 450 may be employed to connect one or more corresponding output devices 452 to system bus 405. Examples of output devices include a monitor or display screen, a speaker, a wireless transmitter, a printer, and the like. A particular output device 452 may be integrated with or peripheral to computer device 400. Examples of output interfaces include a video adapter, an audio adapter, a parallel port, and the like.

One or more network interfaces 460 enable computer device 400 to exchange information with one or more local or remote computer devices, illustrated as computer devices 462, via a network 464 that may include one or more hardwired and/or wireless links. Examples of the network interfaces include a network adapter for connection to a local area network ("LAN") or a modem, BLUETOOTH™, WiFi, a cellular connection, a wireless link, or another adapter for connection to a wide area network ("WAN"), such as the Internet. The network interface 460 may be incorporated with or be peripheral to computer device 400.

Figure 10:
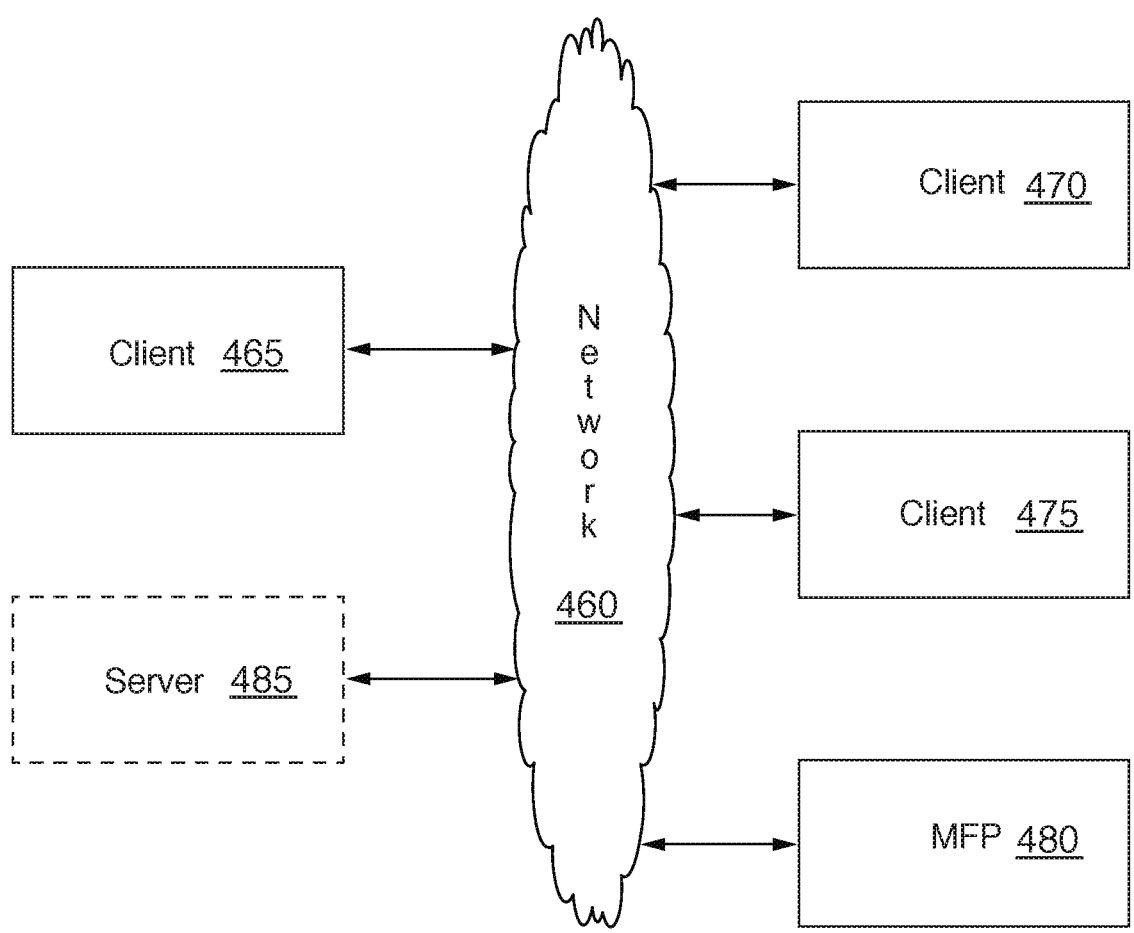
FIG. 10 illustrates a representative embodiment of a networked system that provides a suitable operating environment for use with some embodiments of the undercarriage material handling system.

In a networked system, accessible program modules or portions thereof may be stored in a remote memory storage device. Furthermore, in a networked system computer device 400 may participate in a distributed computing environment, where functions or tasks are performed by a plurality networked computer devices. While those skilled in the art will appreciate that the described systems and methods may be practiced in networked computing environments with many types of computer system configurations, FIG. 10 represents an embodiment of a portion of the described systems in a networked environment that includes clients (465, 470, 475, etc.) connected to a server 485 via a network 460. While FIG. 10 illustrates an embodiment that includes 3 clients (e.g., undercarriage material handling systems 10, etc.) connected to the network, alternative embodiments include at least one client connected to a network or many clients connected to a network. Moreover, embodiments in accordance with the described systems and methods also include a multitude of clients throughout the world connected to a network, where the network is a wide area network, such as the Internet. Accordingly, in some embodiments, the described systems and methods can allow for remote: monitoring, training, communication, observation, control, adjustment, trouble shooting, data collecting, system optimization, user interaction, and/or other controlling of the described undercarriage material handling system 10 from one or more places throughout the world.

Thus, some embodiments of the current invention relate to systems and methods for constructing and/or maintaining one or more roads and/or other similar surfaces. More particularly, some embodiments of the described invention relate to systems and methods for moving gravel and/or another material from a first portion to a second portion of a vehicle. Specifically, in some embodiments, gravel and/or any other suitable material is moved from a first end of a vehicle, under a frame, carriage, axle, and/or other component of the vehicle and is then released from a second end of the vehicle and spread on to a road and/or any other suitable surface. In some cases, the vehicle includes a chip spreader that includes a tractor, truck, and/or other vehicle that has a conveyor, auger, and/or other material handling system that is at least partially disposed below one or more portions of the vehicle, such as the vehicle's frame, carriage, axles, and/or other components.

The present invention may be embodied in other specific forms without departing from its spirit or essential characteristics. The described embodiments, examples, and illustrations are to be considered in all respects only as illustrative and not restrictive. The scope of the invention is, therefore, indicated by the appended claims rather than by the foregoing description. Each of the various elements of the described embodiments, implementations, figures, and examples can be mixed and matched with each other in any suitable manner. All changes that come within the meaning and range of equivalency of the claims are to be embraced within their scope. In addition, as the terms on, disposed on, attached to, connected to, coupled to, etc. are used herein, one object (e.g., a material, element, structure, member, etc.) can be on, disposed on, attached to, connected to, or coupled to another object-regardless of whether the one object is directly on, attached, connected, or coupled to the other object, or whether there are one or more intervening objects between the one object and the other object. Also, directions (e.g., front back, on top of, below, above, top, bottom, side, up, down, under, over, upper, lower, lateral, etc.), if provided, are relative and provided solely by way of example and for ease of illustration and discussion and not by way of limitation. Where reference is made to a list of elements (e.g., elements a, b, c, etc.), such reference is intended to include any one of the listed elements by itself, any combination of less than all of the listed elements, and/or a combination of all of the listed elements. Furthermore, as used herein, the terms a, an, and one may each be interchangeable with the terms at least one and one or more.

What is claimed is:

1. An undercarriage material handling system comprising:
   a material transfer device that is configured to move bulk material from a first portion of a vehicle to a second portion of the vehicle; and
   a coupler that couples the material transfer device to an underside of the vehicle such that the material transfer device is configured to carry the bulk material above a surface on which the vehicle is disposed and below an axle of the vehicle.

2. The system of claim 1, wherein the coupler is configured to couple the material transfer device to the underside of the vehicle such that a portion of the material transfer device is disposed below, and is configured to move the bulk material below, both a front axle and a rear axle of the vehicle.

3. The system of claim 1, wherein the coupler comprises a coupling mechanism that is configured to selectively couple the material transfer device to, and to selectively decouple the material transfer device from, the underside of the vehicle such that when the material transfer device is coupled to the underside of the vehicle, the material transfer device is configured to carry the bulk material below the axle of the vehicle.

4. The system of claim 1, wherein the material transfer device comprises a longitudinal axis that runs at an angle that is greater than 5 degrees and less than 45 degrees of being parallel with a flat surface when the material transfer device is coupled to the vehicle and when the vehicle is disposed on the flat surface.

5. The system of claim 1, wherein the material transfer device, which is configured to carry the bulk material above the surface on which the vehicle is disposed and below the axle of the vehicle, comprises a device selected from a conveyor and an auger.

6. The system of claim 1, further comprising a first hopper that is configured to provide the bulk material to a first portion of the material transfer device and a second hopper that is configured to receive the bulk material from a second portion of the material transfer device.

7. A chip spreader comprising,
   a motorized vehicle comprising an axle;
   a material transfer device that is configured to move bulk material from a first end of the motorized vehicle to a second end of the motorized vehicle;
   a first hopper that is disposed at the first end of the vehicle, the first hopper being configured to receive the bulk material and to dispense the bulk material to the material transfer device; and
   a second hopper that is disposed at the second end of the motorized vehicle, the second hopper being configured to receive the bulk material from the material transfer device and to release the bulk material onto a surface that is below the motorized vehicle,
   wherein a portion of the material transfer device is disposed below the axle such that as the bulk material is moved from the first end to the second end of the motorized vehicle, the bulk material passes below the axle.

8. The chip spreader of claim 7, wherein the first hopper is configured to drop the bulk material down to the material transfer device, and wherein the material transfer device is configured to drop the bulk material down to the second hopper.

9. The chip spreader of claim 7, wherein a bulk material support surface of the material transfer device comprises a longitudinal axis that runs at an angle that is greater than 5 degrees and that is less than 45 degrees of being parallel with a flat surface when the vehicle is disposed on the flat surface.

10. The chip spreader of claim 7, wherein an angle of a longitudinal axis of the material transfer device is configured to be selectively adjusted.

11. A chip spreader comprising,
a motorized vehicle comprising a rear axle and a front axle;
a material transfer device that is coupled to the motorized vehicle such that a portion of the material transfer device is disposed below the rear axle and the front axle so that as a bulk material that comprises at least one of (i) rock and (ii) sand is moved from a first end to a second end of the material transfer device, the bulk material passes below both the rear axle and the front axle, wherein the material transfer device comprises a first transfer mechanism selected from a first conveyor and a first auger;
a first hopper at a first end of the motorized vehicle that is configured to receive the bulk material and provide the bulk material to the material transfer device; and
a second hopper at a second end of the motorized vehicle that is configured to receive the bulk material from the first transfer mechanism and to release the bulk material onto a surface that is below the vehicle.

12. The chip spreader of claim 11, wherein the motorized vehicle comprises a first set of tires at a first side of the motorized vehicle and a second set of tires at a second side of the vehicle, and wherein the material transfer device is disposed between the first and second set of tires.

13. The chip spreader of claim 11, wherein the material transfer device further comprises a second transfer mechanism selected from a second conveyor and a second auger.

14. The chip spreader of claim 13, further comprising a third hopper that is disposed at the second end of the motorized vehicle, wherein the second transfer mechanism is configured to deliver the bulk material to the third hopper.

15. The chip spreader of claim 11, wherein the material transfer device is configured to selectively decouple from the motorized vehicle.

16. The chip spreader of claim 11, wherein an angle of a longitudinal axis of the material transfer device is configured to be selectively adjusted.

17. The chip spreader of claim 11, wherein the material transfer device comprises a longitudinal axis that runs at an angle that is greater than 5 degrees and less than 40 degrees of being parallel with a flat surface when the vehicle is disposed on the flat surface.

18. The chip spreader of claim 12, wherein the material transfer device further comprises a second transfer mechanism selected from a second conveyor and a second auger, wherein the chip spreader further comprises a third hopper that is disposed at the second end of the motorized vehicle, wherein the second transfer mechanism is configured to deliver the bulk material to the third hopper, wherein the material transfer device is configured to selectively decouple from the motorized vehicle, and wherein an angle of a longitudinal axis of the material transfer device is configured to be selectively adjusted.

19. The chip spreader of claim 11, wherein the material transfer device is powered by a power take-off of the motorized vehicle.

20. The chip spreader of claim 11, further comprising a live bottom hopper that is coupled to the motorized vehicle and that is configured to feed the bulk material into the first hopper.

* * * * *